(12) United States Patent
Park et al.

(10) Patent No.: US 11,544,734 B2
(45) Date of Patent: Jan. 3, 2023

(54) SMART SHOPPING METHOD AND SMART SHOPPING MANAGEMENT SERVER

(71) Applicant: HAREXINFOTECH INC., Seoul (KR)

(72) Inventors: Kyung Yang Park, Seoul (KR); Hoon Joon Jung, Gunpo-si (KR)

(73) Assignee: HAREXINFOTECH INC., Seoul (KR)

( * ) Notice: Subject to any disclaimer, the term of this patent is extended or adjusted under 35 U.S.C. 154(b) by 752 days.

(21) Appl. No.: 14/907,000

(22) PCT Filed: Jul. 18, 2014

(86) PCT No.: PCT/KR2014/006543
§ 371 (c)(1),
(2) Date: Apr. 4, 2016

(87) PCT Pub. No.: WO2015/012536
PCT Pub. Date: Jan. 29, 2015

(65) Prior Publication Data
US 2016/0210653 A1    Jul. 21, 2016

(30) Foreign Application Priority Data

Jul. 22, 2013  (KR) .................. 10-2013-0086124
Jun. 26, 2014  (KR) .................. 10-2014-0078827

(51) Int. Cl.
*G06Q 30/02*    (2012.01)
*G06Q 30/06*    (2012.01)

(52) U.S. Cl.
CPC ......... *G06Q 30/0238* (2013.01); *G06Q 30/06* (2013.01)

(58) Field of Classification Search
CPC .................. G06Q 30/0238; G06Q 30/06
See application file for complete search history.

(56) References Cited

U.S. PATENT DOCUMENTS 10,089,606 B2 * 10/2018 Ihm ..................... G06Q 20/02
10,176,474 B2 *  1/2019 Wong ................. G06Q 30/0222
(Continued)

FOREIGN PATENT DOCUMENTS

CN          1655158 A      8/2005
CN          1801207 A      7/2006
(Continued)

OTHER PUBLICATIONS

European Patent Office, Communication dated Dec. 9, 2016 in counterpart European Application No. 14 82 9263.
(Continued)

*Primary Examiner* — Victoria E. Frunzi
(74) *Attorney, Agent, or Firm* — Sughrue Mion, PLLC (57) ABSTRACT

Provided is a smart shopping method using a user terminal. Use information of various benefit means available to a user may be previously checked, set, and stored, and when making a payment, a transaction serial number may be presented to an affiliated store terminal, thereby enabling all benefit means to be easily applied. Also, since a payment serial number is presented along with a transaction serial number, a mobile payment to which a benefit means is applied may be performed by presenting only a user terminal, thereby enabling a user of the user terminal to shop quickly and conveniently.

11 Claims, 4 Drawing Sheets

(56) References Cited

U.S. PATENT DOCUMENTS

| | | | |
|---|---|---|---|
| 2008/0300984 A1* | 12/2008 | Li | G06Q 30/02 705/14.35 |
| 2011/0153403 A1* | 6/2011 | Postrel | G06Q 30/02 705/14.29 |
| 2012/0101885 A1 | 4/2012 | Lee et al. | |
| 2013/0060701 A1 | 3/2013 | Moon et al. | |
| 2013/0238455 A1* | 9/2013 | Laracey | G06Q 20/108 705/21 |
| 2013/0256403 A1* | 10/2013 | MacKinnon Keith | G06K 5/00 235/375 |
| 2014/0122213 A1* | 5/2014 | Wong | G06Q 30/0233 705/14.33 |
| 2014/0297381 A1 | 10/2014 | Park | |

FOREIGN PATENT DOCUMENTS

| | | |
|---|---|---|
| KR | 10-2005-0071174 A | 7/2005 |
| KR | 10-2011-0112594 A | 10/2011 |
| KR | 1020110123201 A | 11/2011 |
| KR | 10-2012-0087345 A | 8/2012 |
| KR | 10-1184865 B1 | 9/2012 |
| KR | 10-2013-0008000 A | 1/2013 |
| KR | 1020130070510 A | 6/2013 |
| KR | 10-2013-0079258 A | 7/2013 |

OTHER PUBLICATIONS

Korea Intellectual Property Office, Correspondence dated Oct. 1, 2013 issued in counterpart KR Application No. 10-2013-0086124.
Korea Intellectual Property Office, Correspondence dated Sep. 2, 2015, issued in counterpart KR Application No. 10-2014-0078827.
International Searching Authority, International Search Report of PCT/KR2014/006543 dated Nov. 25, 2014. [PCT/ISA/210].
Korean Intellectual Property Office, Communication dated Mar. 30, 2016, issued in corresponding Korean Application No. 10-2014-0078827.
Chinese Office Action, dated Jan. 21, 2019, in corresponding Chinese Patent Application No. 201480051487.4.

* cited by examiner

SMART SHOPPING METHOD AND SMART SHOPPING MANAGEMENT SERVER

TECHNICAL FIELD

The present invention relates to a shopping method using a user terminal, and an affiliated terminal and a server for supporting shopping using a user terminal, and more particularly, to a method for providing, through a user terminal, convenience of shopping to a user who shops in an offline space such as a shopping mall, a mart, and/or the like.

BACKGROUND TECHNOLOGY

In a case where a purchaser who purchases a thing on-line or off-line pays the purchasing amount of the thing, the purchaser may pay the purchasing amount by using a point of its own a membership card, a discount coupon, and/or a gift certificate. That is, in paying the purchasing amount through a payment means such as cash or a card, the purchaser may pay, through the payment means, the amount other than the amount which is deducted from the purchasing amount by a discount means such as the point of the membership card.

In this case, there may be a plurality of discount means available to the purchaser. That is, considering that social commerce is popularized and the kind of a discount service provided by a seller or a card company becomes diversified, it may be considered that purchasers generally possess a plurality of discount means.

Therefore, a purchaser possesses a plurality of discount means, and when making payment for getting a discount based on the plurality of discount means, the purchaser should present the plurality of discount means. Particularly, in order to get a discount based on a discount means in an offline space such as a shopping mall or a mart, a purchaser should inconveniently present a discount means such as a membership card, a discount coupon, and/or a gift certificate while presenting a payment means such as cash or a card.

Moreover, when a number of persons stand by in a checkout counter, a payment time is delayed, and for this reason, a total standby time increases. Also, it may be required to check whether a plurality of discount means are capable of being applied, and in this case, a delayed time further increases.

Technical Solutions

In one general aspect, a smart shopping method includes: receiving, by a user terminal, information about a plurality of benefit means available to a user of the user terminal from a shopping management server; receiving use information of the received plurality of benefit means, and when an input of the use information is completed, transmitting the use information to the shopping management server; when the transmitted use information is stored in the shopping management server, by the shopping management server, receiving a transaction serial number that is generated for indexing the stored use information; providing the received transaction serial number to an affiliated store terminal; receiving financial institution information and a payment PIN number to generate a payment serial number; and providing the generated payment serial number to the affiliated store terminal.

The providing of the received transaction serial number may include providing the received transaction serial number in a number form or in a form of wireless code where the received transaction serial number is stored.

The receiving and transmitting of the use information may include: receiving the use information including at least one of information about whether to use the plurality of benefit means and use range information of the plurality of benefit means; and transmitting the received use information and an identification number of the user terminal to the shopping management server.

The receiving of the information about the plurality of benefit means may include receiving information including at least one benefit means of a point of a membership card, a discount coupon, a gift certificate, a point saving card, and a cash receipt card available to the user of the user terminal.

The providing of the generated payment serial number may include generating a single wireless code where the received transaction serial number and the generated payment serial number are stored, and providing the generated wireless code to the affiliated store terminal.

In another general aspect, a smart shopping method includes: obtaining, by an affiliated store terminal, a transaction serial number from a user terminal to transmit the transaction serial number to a shopping management server; receiving use information of a benefit means, used to index the transaction serial number, among pieces of use information of the benefit means stored in the shopping management server; calculating a payment amount to which the received use information of the benefit means is applied; and processing a payment based on the calculated payment amount.

The processing of the payment may include: obtaining a payment serial number from the user terminal; and transmitting the payment serial number and a payment amount, to which the received use information of the benefit means is applied, to a payment processing server to request processing of the payment.

In another general aspect, a smart shopping management server includes: a transaction serial number generator configured to, when information about whether to use of a benefit means and use range information of the benefit means are received from a user terminal, store the information about whether to use of the benefit means and the use range information of the benefit means and generate a transaction serial number for indexing the stored information; a benefit means information transmitter configured to, when the transaction serial number is received from an affiliated store terminal, transmit the information about whether to use of the benefit means and the use range information of the benefit means for indexing the received transaction serial number to the affiliated store terminal; and a payment approval request unit configured to, when a payment serial number is received from the user terminal, transmit the payment serial number to a payment processing server to request payment approval, and when processing result information is received from the payment processing server, transmit the processing result information to the affiliated store terminal.

Other features and aspects will be apparent from the following detailed description, the drawings, and the claims.

Advantageous Effects

Accordingly, the present invention provides a smart shopping method and a smart shopping management server, in which various benefit means (a discount means, a saving means, and/or the like) which are available when a user of a user terminal makes a payment are previously checked and set, and only a transaction serial number is presented to an affiliated store terminal, thereby enabling the affiliated store terminal to quickly make a payment based on a benefit means of a user by using the transaction serial number.

BEST MODE

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

According to an embodiment of the present invention, a user terminal may communicate with a shopping management server, check various benefit means available to a user of the user terminal, and previously set and store use information of the benefit means, and an affiliated store terminal may receive the use information of the benefit means and may make a payment, based on a transaction serial number presented by the user terminal. Accordingly, in a case where a user uses a benefit means, inconvenience of the user is minimized, and a standby time in a checkout counter is reduced.

Moreover, according to another embodiment of the present invention, in making a payment in which a benefit means is reflected, the payment may be made based on a payment serial number presented by a user terminal without a separate payment means such as cash or a card, and thus, the payment to which the benefit means is applied is quickly made by using only the user terminal.

Figure 1A:
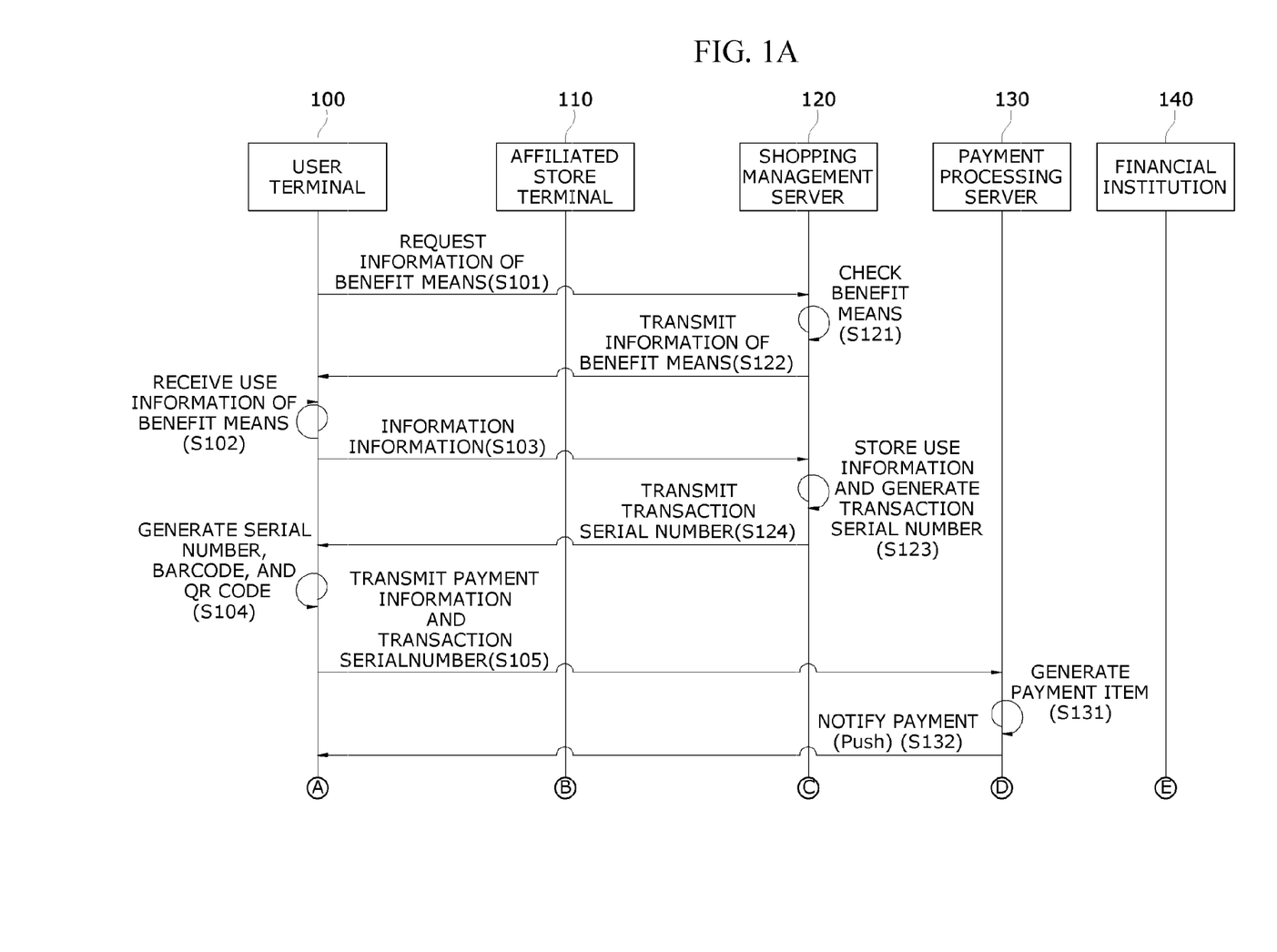
FIGS. 1A and 1B are flowcharts illustrating a whole process of a smart shopping method according to an embodiment of the present invention.
Figure 1B:
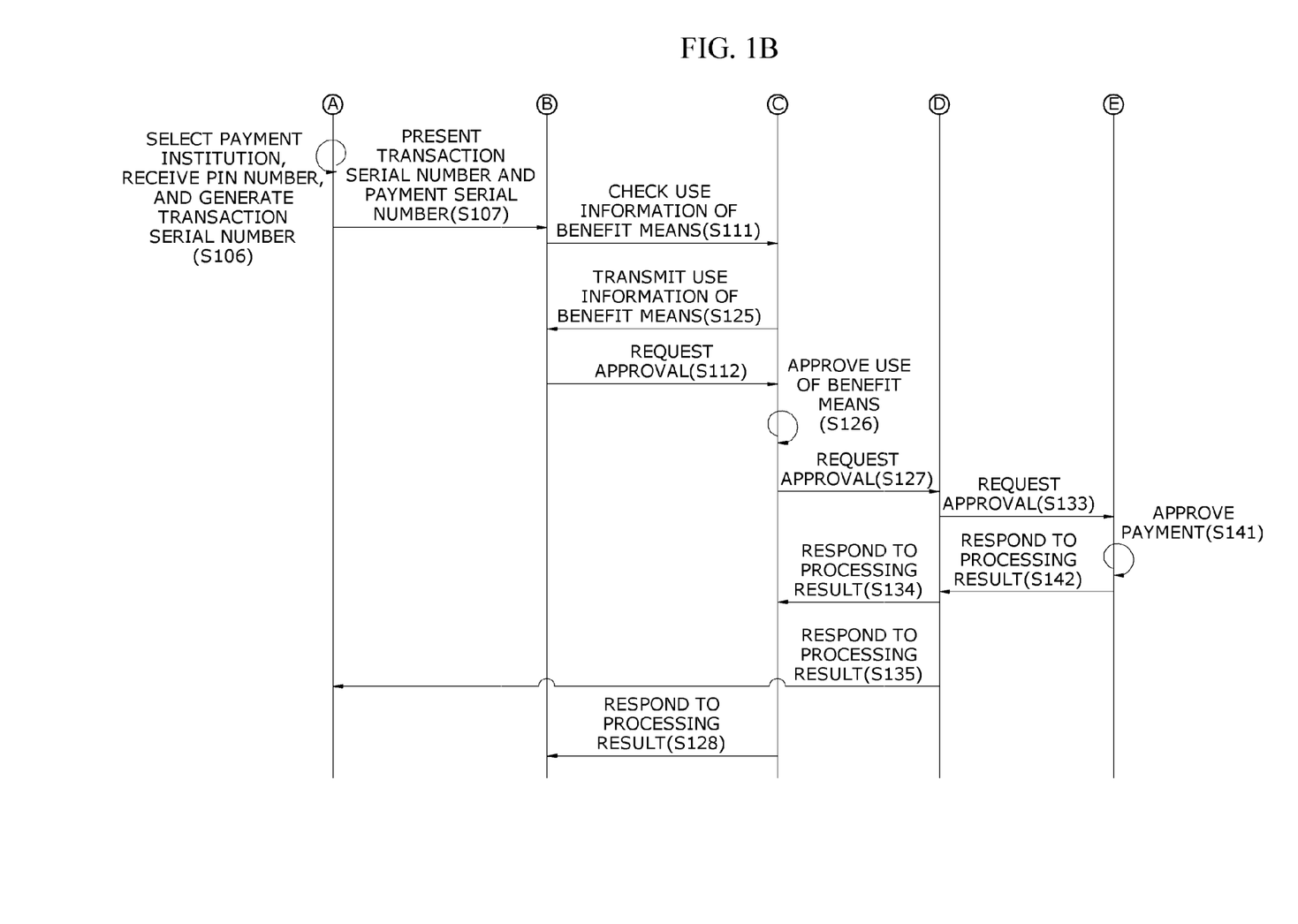

FIGS. 1A and 1B are flowcharts illustrating a whole process of a smart shopping method according to an embodiment of the present invention.

Before starting to shop or after completing the shopping, a user that shops in a shopping mall or a mart may execute an application of a user terminal 100 before starting to shop or before making a payment after the shopping ends, thereby checking a benefit means available to the user. Here, the benefit means may include information about a discount means such as a point of a membership card, a discount coupon, and/or a gift certificate available to the user, information about a point card in which a point obtained by a payment is saved, and information about a cash receipt card where a cash receipt is issued in making a cash payment.

The user terminal 100 may access a shopping management server 120 to request information about a benefit means in step S101, and the shopping management server 120 may check a benefit means available to a user, based on a phone number of the user terminal 100 or an identifier (ID) of the user and may transmit information about the benefit means to the user terminal 100 in step S122. Here, the information about the benefit means may be provided to the user in a state of being previously stored in the user terminal 100, and in this case, the application of the user terminal 100 may communicate with the shopping management server 120 in real time or at certain time intervals and may update and store the information about the benefit means.

When information about various benefit means available to the user of the user terminal 100 is received from the shopping management server 120, the user terminal 100 may display the received information on a screen and then may receive use information of the benefit means from the user in step S102.

The use information of the benefit means may include information about whether to use the benefit means and information about a use range of the benefit means. In this case, a maximum value of the benefit means being used may be fundamentally set, and only the information about whether to use the benefit means may be received from the user.

When an input of the use information of the benefit means is completed, the user terminal 100 may transmit the use information of the benefit means to the shopping management server 120 in step S103. The shopping management server 120 may store the received use information of the benefit means and may generate a transaction serial number corresponding to the stored information in step S123, and may transmit the generated transaction serial number to the user terminal 100 in step S124.

In this case, according to another embodiment of the present invention, when an input of use information of a benefit means is completed, the user terminal 100 may generate a transaction serial number and may transmit the generated transaction serial number and the use information of the benefit means to the shopping management server 120, and the shopping management server 120 may store and manage the received information. In this case, a standby time for which the user terminal 100 stands by for receiving the transaction serial number from the shopping management server 120 is reduced.

In step S104, the user terminal 100 may generate the transaction serial number, received from the shopping management server 120, in a number form or a barcode, QR code, or wireless code (near field communication (NFC), radio frequency (RF), or the like) form including a number. Also, the user terminal 100 may provide the transaction serial number having the generated form to the affiliated store terminal 110 when making a payment later.

Therefore, according to an embodiment of the present invention, when the user terminal 100 presents the transaction serial number to the affiliated store terminal 110, the affiliated store terminal 110 may access the shopping management server 120 to check use information of a benefit means based on the transaction serial number in step S111, and may receive the use information of the benefit means in step S125. Also, the affiliated store terminal 110 may calculate the payment amount by applying the received use information of the benefit means and may allow the calculated payment amount to be paid in cash or a card.

Moreover, according to another embodiment of the present invention, a benefit means may be applied and a payment may be made by using only the user terminal 100 without using a payment means such as cash or a card. In this case, an application for processing a payment may be a separate application which differs from an application that checks, inputs, and receives use information of a benefit means, or one application may process a payment in addition to a check operation, an input operation, and a reception operation.

Hereinafter, a process where the user terminal 100 processes a payment after a transaction serial number is generated will be described.

When the user of the user terminal 100 desires to process a payment by using the application of the user terminal 100, the user terminal 100 may execute the application to transmit payment information and a transaction serial number to a payment processing server 130 in step S105.

The payment processing server 130 that has received the information may generate a payment item in step S131, and may transmit a payment notification push message to the user terminal 100 in step S132.

When the user of the user terminal 100 selects a payment institution and inputs a PIN number, the user terminal 100 may generate a payment serial number in step S106. In step S107, the user of the user terminal 100 may present the generated payment serial number and the transaction serial number to the affiliated store terminal 110 when a payment is made later, and the payment serial number may be presented in a form such as a number or a barcode like the transaction serial number.

According to another embodiment of the present invention, one code which includes a transaction serial number and a payment serial number may be generated, and the generated code may be provided to the affiliated store terminal 110. Here, the code may have a form such as a barcode, a QR code, or a wireless code (RF, NFC, or the like).

That is, when the application of the user terminal 100 is executed, a code which includes a transaction serial number and a payment serial number may be provided to the affiliated store terminal 110, and thus, the affiliated store terminal 110 may scan only one the code to process a mobile payment to which use information of a benefit means desired by the user is applied.

When the user terminal 100 presents the transaction serial number and the payment serial number to the affiliated store terminal 110 in step S107, the affiliated store terminal 110 may transmit the transaction serial number to the shopping management server 120 to check the use information of the benefit means in step S111, and may receive the checked use information of the benefit means in step S125. Also, when the affiliated store terminal 110 issues a request for approval of a payment in which the received use information of the benefit means is reflected in step S112, the shopping management server 120 may approve the use of the benefit means in step S126, and may transmit a payment approval request for the other payment amount to the payment processing server 130 in step S127.

The payment processing server 130 may request approval from a financial institution 140 which is selected as the payment institution by the user in step S133. The financial institution 140 may approve a payment and then may transmit processing result information in step S141, and the payment processing server 130 may receive the processing result information in step S142. Also, the payment processing server 130 may transmit the received processing result information to the shopping management server 120 in step S134, and may also transmit the received processing result information to the user terminal 100 in step S135. When the processing result information is received, the shopping management server 120 may transmit the received processing result information to the affiliated store terminal 110 in step S128, thereby allowing payment processing to be completed based on the processing result information.

Therefore, the user may present the user terminal 100, which is displaying the transaction serial number and the payment serial number, to the affiliated store terminal 110, thereby allowing a payment to be quickly completed based on use information of a predetermined benefit means.

Figure 2:
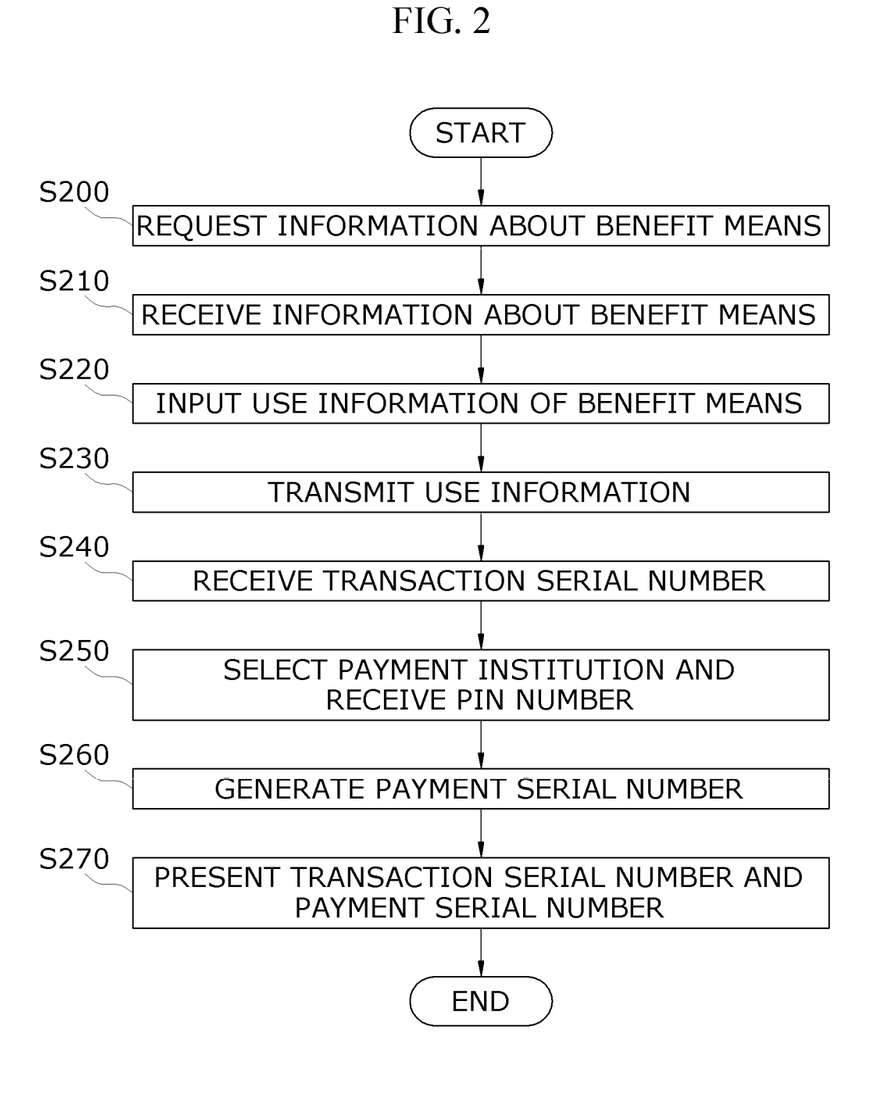
FIG. 2 is a flowchart illustrating a process of a smart shopping method using a user terminal according to an embodiment of the present invention.
Figure 3:
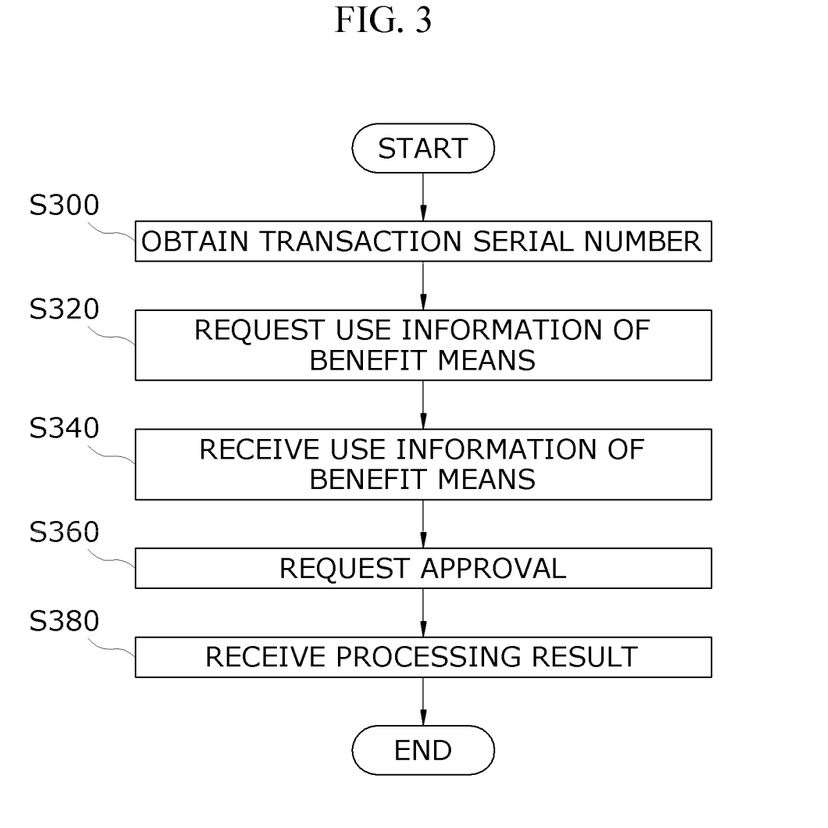
FIG. 3 is a flowchart illustrating a process of a smart shopping method using an affiliated store terminal according to an embodiment of the present invention.

FIGS. 2 and 3 are flowcharts illustrating a process where a smart shopping method according to an embodiment of the present invention is performed by a user terminal and a process where the smart shopping method according to an embodiment of the present invention is performed by an affiliated store terminal.

FIG. 2 is a flowchart illustrating a process of a smart shopping method using a user terminal according to an embodiment of the present invention.

The user terminal may access a shopping management server to request information about a benefit means in step S200, and may receive, from the shopping management server, the information about the benefit means available to a user of the user terminal in step S210. In this case, the information about the benefit means may be updated in real time or at certain time intervals and may be pre-stored in the user terminal.

When the information about the benefit means is received by the user terminal, the user terminal may receive use information of the benefit means in step S220. The use information of the benefit means may include information about whether to use the benefit means and use range information of the benefit means.

When an input of the use information is completed, the user terminal may transmit the use information of the benefit means to the shopping management server in step S230. The shopping management server that has received the use information of the benefit means may store the received information and may generate a transaction serial number corresponding to the stored information to transmit the transaction serial number to the user terminal. The user terminal may receive the transaction serial number in step S240, and when making a payment, the user terminal may use the received transaction serial number.

In this case, when an input of the use information of the benefit means is completed, the user terminal may generate a transaction serial number and may transmit the generated transaction serial number and the use information to the shopping management server.

In a case where the user of the user terminal desires to make a payment by using the user terminal, when the user executes an application to select a payment institution and inputs a PIN number in step S250, the user terminal may generate a payment serial number in step S260.

Moreover, when the user presents the transaction serial number and the payment serial number, displayed by the user terminal, to an affiliated store terminal in step S270, the affiliated store terminal may calculate the payment amount to which the use information of the benefit means is applied, based on the presented payment serial number and may allow the calculated payment amount to be processed through a mobile payment by using the payment serial number.

Therefore, an operation of applying a benefit means and an operation of paying the payment amount may be performed at a time by merely presenting a user terminal.

FIG. 3 is a flowchart illustrating a process of a smart shopping method using an affiliated store terminal according to an embodiment of the present invention.

When an affiliated store terminal receives a transaction serial number from a user terminal in step S300, the affiliated store terminal may transmit the transaction serial number to a shopping management server to request use information of a benefit means corresponding to the transaction serial number in step S320, and may receive the use information of the benefit means from the shopping management server in step S340. Also, the affiliated store terminal may transmit an approval request to the shopping management server in step S360. Here, the approval request may be an approval request for the use of the benefit means or may be an approval request for the use and payment of the benefit means.

If the approval request is the approval request for the use of the benefit means, the payment amount to which the use information of the benefit means is applied may be paid based on cash or a card, and information about where whether the benefit means has been used may be stored in and managed by the shopping management server.

An approval request for the use and payment of the benefit means may be issued when the transaction serial number and the payment serial number are presented from the user terminal. When the affiliated store terminal transmits the approval request for the use and payment of the benefit means to the shopping management server, the shopping management server may store information about the application of the benefit means and may request a payment approval from a payment processing server. Also, when the shopping management server receives processing result information about the payment approval, the shopping management server may transmit the processing result information to the affiliated store terminal. When the affiliated store terminal receives the processing result information in step S380, a payment may be completed.

According to the present invention, if a user of a user terminal presents only a transaction serial number to a checkout counter, an affiliated store terminal may search for information stored in a shopping management server, based on the transaction serial number and may make a payment by applying a plurality of benefit means (a discount means, a saving means, and/or the like) available to the user, thereby shortening a standby time in a checkout counter and enabling a user to easily use various benefit means.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A smart shopping method of a user terminal, the smart shopping method comprising:

receiving, from a shopping management server, information about a plurality of benefit means available to a user of the user terminal;

receiving use information of the plurality of benefit means available to the user, the use information comprising information of a benefit means selected from the plurality of benefit means, and an amount of the selected benefit means to be applied to an upcoming transaction;

generating, by the user terminal, a payment serial number based on a financial institution and a payment personal identification number (PIN) that are inputted to the user terminal;

transmitting the use information to the shopping management server that generates a transaction serial number based on the use information;

upon receiving the transaction serial number from the shopping management server, generating, by the user terminal, a single code including the transaction serial number, which is generated by the shopping management server based on the use information of the benefit means and is received from the shopping management server, and the payment serial number that is generated by the user terminal, and providing the single code to an affiliated store terminal to allow the affiliated store terminal to access the shopping management server storing the use information and obtain an approval for using the amount of the selected benefit means from the shopping management server, and obtain from the financial institution through the shopping management server, a payment approval for the transaction to which the amount of the selected benefit means is applied, wherein a scan of the single code by the affiliated store terminal enables an amount of the transaction to be automatically reduced by the shopping management server to reflect the amount of the selected benefit means, via interaction between the affiliated store terminal and the shopping management server, and enables the reduced amount of the transaction to be stored in the shopping management server and processed by the financial institution, via interaction between the shopping management server and the financial institution.

2. The smart shopping method of claim 1, wherein the transmitting of the single code comprises transmitting the transaction code in a number form or in a form of wireless code.

3. The smart shopping method of claim 1, wherein the plurality of benefit means further comprises a point of a membership card, and a cash receipt card available to the user of the user terminal.

4. The smart shopping method of claim 1, wherein the amount of the selected benefit means to be applied to the upcoming transaction is set to a maximum value of the benefit means by default.

5. A smart shopping method of an affiliated store terminal, the smart shopping method comprising:

obtaining, from a user terminal, a single code that is generated by the user terminal, and include a transaction serial number, and a payment serial number, wherein the transaction serial number is generated by a shopping management server based on use information of a selected benefit means and is received from the shopping management server, and the payment serial number is generated by the user terminal based on a financial institution and a payment personal identification number (PIN) that are inputted to the user terminal;

based on the single code, receiving, from the shopping management server, the use information of the selected benefit means selected from a plurality of benefit means available to a user, the use information comprising information of a benefit means selected from the plurality of benefit means and an amount of the selected benefit means to be applied to an upcoming transaction;

calculating a payment amount for the transaction based on the use information; and based on the single code, requesting the shopping management server to approve the calculated payment amount through communication with a payment processing server and the financial institution, wherein a scan of the single code by the affiliated store terminal enables an amount of the transaction to be automatically reduced by the shopping management server to reflect the amount of the selected benefit means, via interaction between the affiliated store terminal and the shopping management server, and enables the reduced amount of the transaction to be stored in the shopping management server and processed by the financial institution, via interaction between the shopping management server and the financial institution.

6. The smart shopping method of claim 5, wherein the obtaining the single code comprises obtaining the single code by using a wireless code provided by the user terminal.

7. The smart shopping method of claim 5, wherein the requesting the shopping management server to approve the calculated payment amount comprises:

transmitting the single code and the payment amount to the payment processing server to request approval of the calculated payment amount.

8. The smart shopping method of claim 7, further comprising: receiving processing result information of the requested payment from the payment processing server.

9. A smart shopping method of a smart shopping management server, the smart shopping method comprising:

receiving, from a user terminal, use information comprising information of a benefit means selected from a plurality of benefit means available to a user of the user terminal, and an amount of the selected benefit means to be applied to an upcoming transaction;

generating a transaction serial number based on the use information;

transmitting the transaction serial number to the user terminal;

receiving, from the affiliated store terminal, a single code that is generated by the user terminal, and include the transaction serial number and a payment serial number, the transaction serial number being generated by the shopping management server based on the use information of the selected benefit means and being received from the shopping management server, the payment serial number being generated by the user terminal based on a financial institution and a payment personal identification number (PIN) which are inputted into the user terminal; and transmitting the use information and a payment approval to the affiliated store terminal in response to receiving the single code from the affiliated store terminal, wherein a scan of the single code by the affiliated store terminal enables an amount of the transaction to be automatically reduced by the shopping management server to reflect the amount of the selected benefit means, via interaction between the affiliated store terminal and the shopping management server, and enables the reduced amount of the transaction to be stored in the shopping management server and processed by the financial institution, via interaction between the shopping management server and the financial institution.

10. The smart shopping method of claim 9, further comprising:

when the single code including the payment serial number is received from the user terminal, transmitting the payment serial number to a payment processing server to request the payment approval; and when processing result information is received from the payment processing server, transmitting the processing result information to the affiliated store terminal.

11. The smart shopping method of claim 9, further comprising:

receiving an identification number of the user terminal from the user terminal; and transmitting the generated transaction serial number to the user terminal.

\* \* \* \* \*